United States Patent [19]

Smith

[11] 4,229,937
[45] Oct. 28, 1980

[54] SHUT-OFF VALVE ARRANGEMENTS FOR FLUIDS

[75] Inventor: Trevor S. Smith, Sutton Coldfield, England

[73] Assignee: Lucas Industries Limited, Birmingham, England

[21] Appl. No.: 958,536

[22] Filed: Nov. 7, 1978

[30] Foreign Application Priority Data

Nov. 11, 1977 [GB] United Kingdom ............... 46986/77

[51] Int. Cl.³ .................................................. F02C 9/04
[52] U.S. Cl. .................................... 60/39.28 R; 251/29
[58] Field of Search ................... 60/39.28, 243; 251/29

[56] References Cited

U.S. PATENT DOCUMENTS

| | | | |
|---|---|---|---|
| 2,936,995 | 5/1960 | Girardin | 251/29 |
| 3,023,781 | 3/1962 | Larsen | 251/29 |
| 3,300,714 | 1/1967 | Shiels | 251/29 |
| 3,874,170 | 4/1975 | Lewis | 60/243 |
| 3,880,186 | 4/1975 | Turner et al. | 251/29 |

Primary Examiner—Robert E. Garrett

[57] ABSTRACT

A servo-operated shut-off valve arrangement has a main valve responsive to a servo pressure and fluid pressure operated pilot valve for controlling the servo pressure. The pilot valve has two stable operating positions in which the main valve servo pressure is respectively vented and maintained. The fluid pressure which operates the pilot valve is controlled by a valve device movable in opposite directions from a center-stable position to effect movement of the pilot valve. The pilot valve co-operates with the center-stable valve device so that the pilot valve remains in the position in which it was last urged by movement of the valve device away from its stable central position.

5 Claims, 4 Drawing Figures

SHUT-OFF VALVE ARRANGEMENTS FOR FLUIDS

This invention relates to shut-off valve arrangements for use in fluid regulating systems, and in a particular embodiment to a shut-off valve arrangement for a gas turbine engine fuel control system.

The invention also relates to a gas turbine engine fuel control system incorporating a shut-off valve arrangement according to the invention.

It is known, for example from British Pat. No. 1,465,480 to provide a fuel control system having a flow limiting valve which is arranged in series with a variable metering device, the flow limiting valve being controlled by a servo pressure which is responsive to a rise above an acceptable limit of an operating condition, for example speed or temperature of the engine, to reduce fuel flow through the limiting valve. The servo pressure is controlled by an electrically operable pilot valve.

It is also known from the above Patent to arrange that the limiting valve may provide a shut-off function, for which purpose a control valve is arranged in parallel with the pilot valve, whereby the servo pressure can be changed to urge the limiting valve to a shut-off position. The aforesaid parallel control valve has hitherto been manually operated.

Though it is desirable in modern control systems that the aforesaid parallel control valve should be electrically actuated, it has proved a difficulty that failure of the associated actuator, or of the electrical actuating signal, could result in the limiting valve moving away from its selected position.

It is an object of the invention to provide an electrically controlled fluid shut-off valve arrangement, in which the foregoing difficulty is overcome. It will be understood that a shut-off valve arrangement of the type provided by the present invention may be applicable to fluid control systems other than gas turbine engine fuel controls. It will also be understood that the present invention is not necessarily limited to valve arrangements which also include a flow limiting function.

According to the invention a shut-off valve arrangement for use in a fluid regulating system comprises a shut-off valve having a control member and biasing means urging said control member to a shut position, said control member being urged against said biasing means by a first servo pressure, a first pilot valve having a fluid pressure operable control element movable between a first position in which said first servo pressure is vented, and a second position, electrically energisable centre-stable valve means for applying operating pressures to said pilot valve control element so that movement of said valve means in a first sense from its stable central position causes said pilot valve control element to be urged to its first position, movement of said valve means in a second sense from its stable central position causes said pilot valve control element to be urged to its second position, and in the de-energised condition of said valve means said pilot valve control element is maintained in the position to which it was last urged.

In one embodiment of the invention, said centre-stable valve means comprises two control valves, a centre-stable electrical actuator, and means for connecting said control valves to said actuator so that when said actuator is in its stable central position, one of said control valves is open and the other of said control valves is shut, when said actuator is energised in said first sense both of said control valves are shut, and when said actuator is energised in said second sense both of said control valves are open.

In a further embodiment, said first pilot valve includes biasing means urging said control element towards one of its positions and said operating pressures are operable to urge said control element against said biasing means, said control element including means for shutting off the operating pressure from one of said control valves when said control element is in said one position.

A preferred embodiment includes a second pilot valve in parallel with said first pilot valve, for regulating said first servo pressure, and said shut-off valve control member includes means for regulating fluid flow in accordance with the magnitude of said first servo pressure.

According to another aspect of the invention, a fuel control system for a gas turbine engine comprises a variable metering device and a shut-off valve arrangement as above defined in series with said metering device.

An embodiment of the invention will now be described by way of example only and with reference to the accompanying drawings in which.

Figure 1:
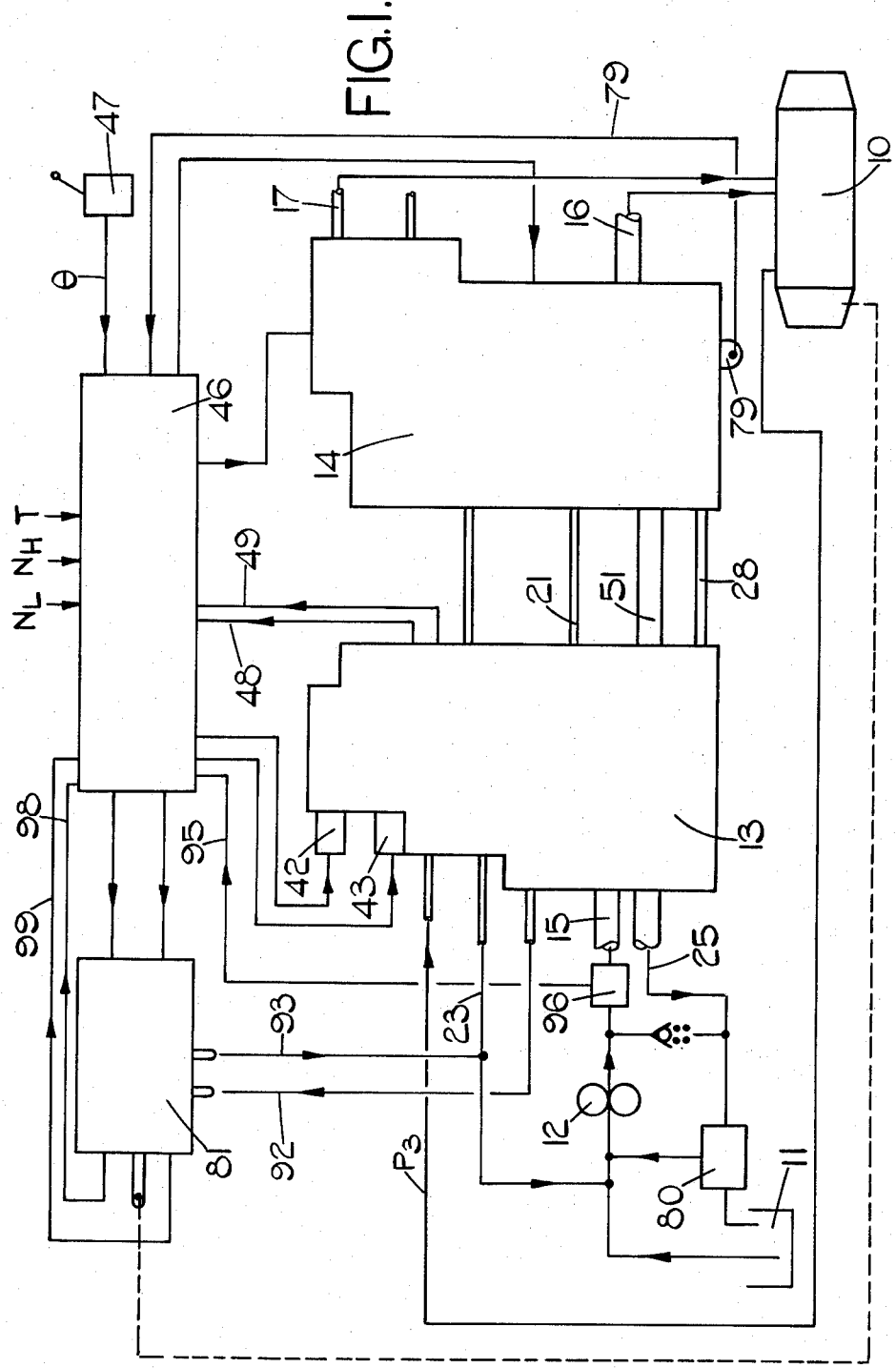
FIG. 1 is a block diagram of a control system for a gas turbine engine.

As shown in FIG. 1, a gas turbine engine 10 is supplied with fuel from a tank 11 by means of a pump 12. Fuel flows from the pump 12 to the engine 10 by way of a variable metering arrangement 13 and a combined shut-off and limiting valve 14 which are arranged in series between a delivery passage 15 from the pump 12 and supply passages 16, 17 to the main and starter burners respectively of the engine 10.

Figure 2:
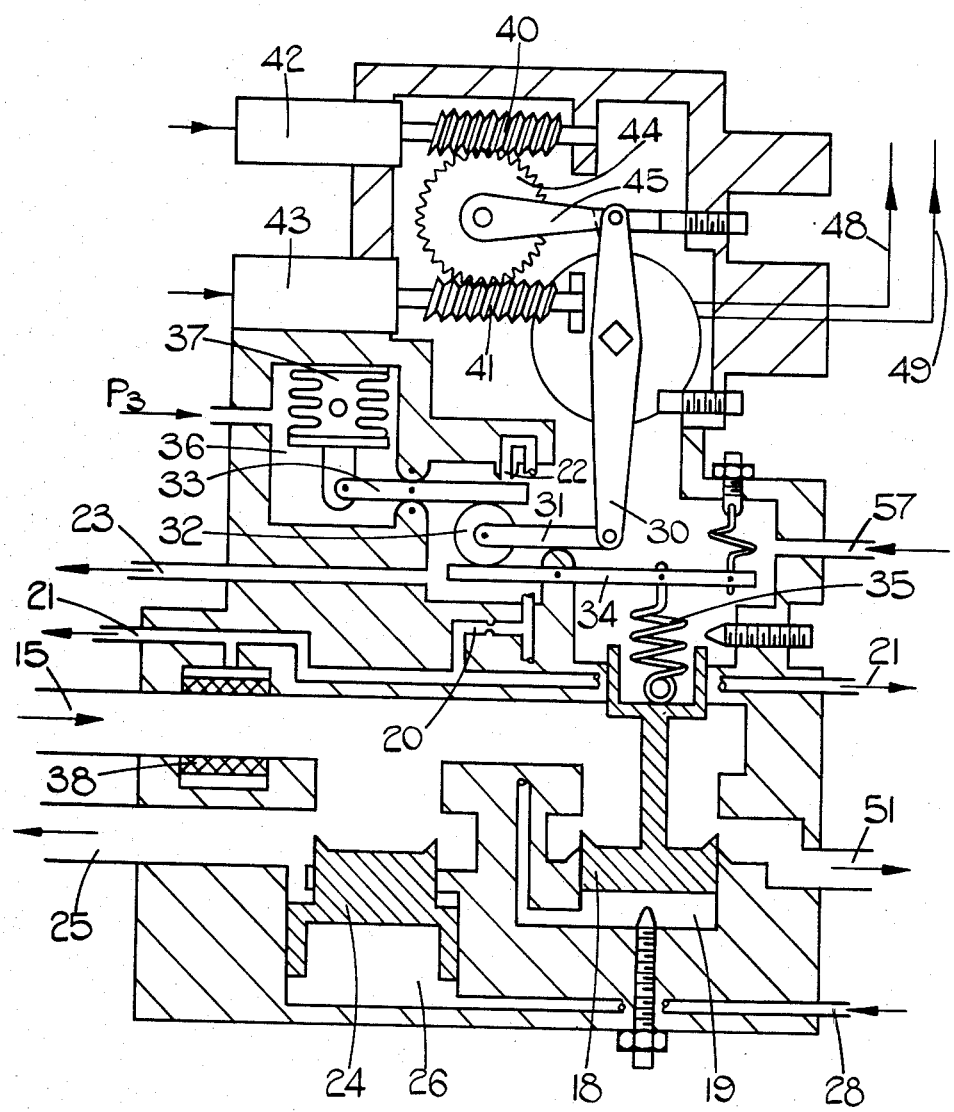
FIG. 2 shows, diagrammatically, a variable metering device forming part of the system of FIG. 1.

As shown in FIG. 2, the metering arrangement 13 includes a metering valve 18 which receives fuel from the passage 15. The valve 18 is responsive to a servo pressure in a chamber 19. Chamber 19 communicates with the passage 15 by way of a restrictor 20, a passage 21 and a filter unit 38. The chamber 19 also communicates with the upstream side of the pump 12 through a pilot valve 22 and a passage 23.

A spill valve 24 allows fuel to be spilt from the passage 15 by way of a return line 25 to the inlet of the pump 12. The spill valve 24 is urged open by the pressure in passage 15 and is urged shut by a servo pressure in a chamber 26. A valve 27 (FIG. 3), later to be described, supplies this servo pressure by means of a line 28.

A lever 30 coacts with an arm 31 at the free end of which is a roller 32. The roller 32 is engaged between a lever 33 and a further lever 34 which provides a control element for the pilot valve 22. A spring 35 is engaged between the lever 34 and the metering valve 18 to provide a position feed-back signal from the valve 18. The lever 33 extends sealingly into a chamber 36 and is acted on by an evacuated bellows unit 37. The bellows unit 37 is responsive to a delivery pressure P3 of the engine compressor.

Two worms 40, 41 are drivingly connected to respective stepping motors 42, 43 both of the worms 40, 41 mesh with a wheel 44. An arm 45 is mounted on the wheel 44 so that the later can rotate relative to the arm 45. The arm 45 pivotally engages an end of the lever 30 remote from that engaged by the arm 31.

The stepping motors 42, 43 are controlled by a control circuit 46 (FIG. 1) which is responsive to the speeds NL, NH of the low pressure and high pressure shafts respectively of the engine 10, to the position θ of a speed demand device 47, and to an engine temperature T. The circuit 46 is also responsive to position feed-back signals from the lever 30, on lines 48, 49. The control circuit 46 is so arranged that in normal operation only the stepping motor 42 is driven, the stepping motor 43 being held stationary and the worm 41 acting as a reaction member for the wheel 44. In the event of malfunction of the motor 42, or interruption of the control signals thereto, motor 42 is arrested and motor 43 is driven to position the lever 30.

The lever control element 33 of the pilot valve 22 is thus position in accordance with engine compressor pressure P3, and the position feed-back signal provided by the spring 35 is modified, by means of the roller 32, in accordance with engine speeds NH, NL engine temperature T and speed demand θ.

The combined shut-off and limiting valve arrangement 14 comprises a valve 50 whose inlet communicates with an outlet of the metering valve 18 by way of a passage 51. The valve 50 includes a control member 52 which is responsive to a servo pressure in a chamber 53. The chamber 53 communicates with a zone immediately downstream of the valve 50 by way of a restrictor 54. The pressure in the chamber 53 is responsive to operation of a first pilot valve 61 and a second pilot valve 55, these pilot valves being arranged in parallel.

Figure 3:
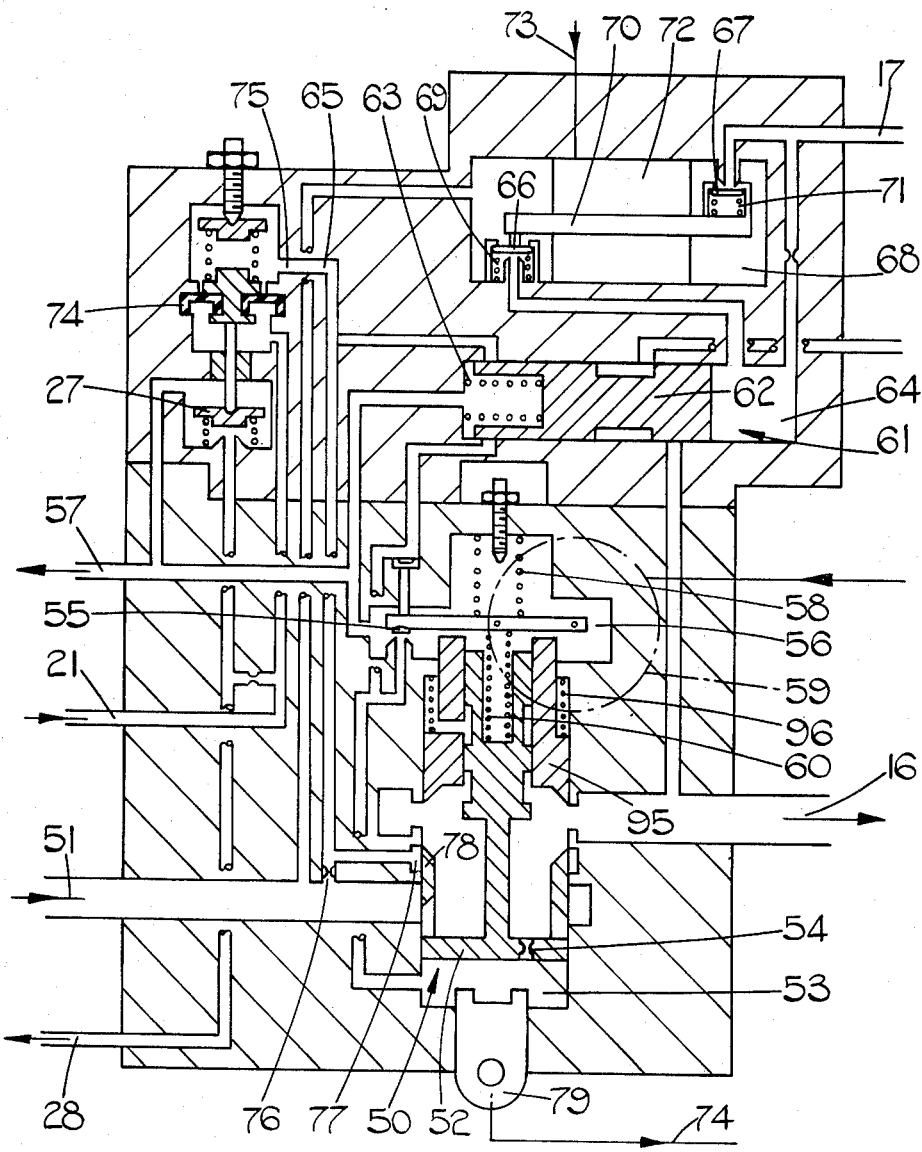
FIG. 3 shows, diagrammatically, a combined shut-off valve and limiting valve arrangement, forming part of the system of FIG. 1.

The first pilot valve 61 has a spool control element 62. In its leftward position, as seen in FIG. 3, the control element 62 shuts off a parallel connection between the chamber 53 and the passage 57, in which circumstances the control member 52 is positioned by the pilot valve 55. The spool control element 62 is biased rightwardly by a spring 63 and is movable against this bias by the pressure in the chamber 64.

The pressure in chamber 64 is derived from that in the passage 51 by a line 65 and either a first control valve 66 or a second control valve 67. The line 65 can communicate directly with the chamber 64 by way of the first control valve 66. The line 65 can communicate with the supply passage 17 to the engine by way of the control valve 67. The passage 17 communicates with the chamber 64 by way of a restrictor 68.

The valve 66 is biased to an open position by a spring 69 and is movable against this bias by one end of a lever 70. The valve 67 is captive on the other end of the lever 70 and is biased by a spring 71 towards a shut position. The lever 70 is pivotally movable by a torque motor 72. The motor 72 is biased towards a stable central position, shown in FIG. 3, and is rotatable in either a clockwise or an anti-clockwise direction away from its stable central position by electrical signals of the appropriate sense on a line 73 from the control circuit 46.

With the torque motor 72 and arm 70 in the anti-clockwise operating position shown, valve 66 is open and valve 67 is shut. Fuel pressure in the passage 51 is thus supplied through the line 65 and valve 66 to the chamber 64, urging the spool control element 62 to its shut position (as shown). If the torque motor 72 is energised anti-clockwise, in response to a requirement to shut-off fuel flow to the engine, valve 66 is shut, valve 67 remains shut, and the fuel pressure in chamber 64 bleeds away through the restrictor 68 and the supply passage 17. The spool control element 62 moves to the right, and chamber 53 is connected to the upstream side of the pump 12 through a passage 57 and the passage 23. The servo pressure in chamber 53 thus drops and the control member 52 moves downwards to its shut position.

In the rightward position of the element 62 the connection of the chamber 64 with the valve 66 is shut off. If the torque motor 72 is subsequently de-energised and returns to its central position in which valve 66 is open, fuel pressure is still not applied to the chamber 64.

If the torque motor 72 is then energised clockwise, valve 67 is opened and valve 66 remains open. Fuel pressure from the passage 51 is thus applied by way of the valve 67 to the supply passage 17 to ignite the engine burners, and is also applied by way of the restrictor 68 to urge the control element 62 against the spring 68. The pilot valve 61 thus shuts, raising the pressure in chamber 53 and moving the control member 52 away from its shut position, and placing it under the control of the pilot valve 55. Subsequent de-energisation of the torque motor 72 returns the lever 70 to the position shown, in which the pilot valve 61 is maintained in its shut position.

The valves 61, 66 and 67 thus provide a bistable arrangement which is responsive to operation of the torque motor 72 for a relatively short period in an appropriate sense, from its stable central position. Failure of the torque motor 72 or of the control signals thereto, will not cause the control element 62 of the pilot valve 61 to be moved away from the position to which it was last urged.

The second pilot valve 55 is interposed between the chamber 53 and a chamber 56 which is connected to the upstream side of the pump 12 by means of passages 23, 57. The pilot valve 55 is biased shut by a spring 58 and is movable against this biasing spring by an electrical torque motor 59 which is controlled by the circuit 46 so as to be responsive to the values of engine speed and combustion chamber temperature, an unacceptable rise in these values causing the valve 55 to be opened so that the control member 52 moves downwards, as seen in FIG. 3, to restrict fuel flow to the supply passage 16. A feed-back spring 60 coacts with the control member 52 and the pilot valve 55, so that movement of the control member 52 causes a change in the servo pressure in the chamber 53 which opposes that movement.

A sensing device 79 provides an electrical signal on a line 74 to the control circuit 46, indicative of the fact that the control member 52 is in its shut position.

The valve 27, referred to above, is acted upon by a diaphragm device 74. The respective sides of the device 74 are acted on by the pressure in the pump delivery passage 15 and the pressure in a passage 75. Passage 75 communicates with the passage 51, that is, immediately downstream of the metering valve 18, by way of a restrictor 76, and also with the zone immediately downstream of the valve 50 by way of a port 77 which can be closed off by a part 78 of the control member 52 when the latter is in its fully open position. Thus with the control member 52 fully open, and the port 77 shut, the pressure in passage 75 is that in passage 51 at the outlet of metering valve 18. In this condition the pressure in the passage 28 to the spill valve 24 is dependent on the pressure drop across the metering valve 18. In all other conditions of the control element 52 the port 77 is at least partly open, whereby the pressure in passage 75 is dependent on the pressure downstream of the valve 50. In these circumstances the spill valve 24 is responsive to the pressure drop across the series arrangement of the metering valve 18 and the valve 50.

When the control element 62 of the pilot valve 61 is in its rightward position, corresponding to a requirement to shut off fuel flow to the engine, the pressure in passage 75 is vented to passage 57, the valve 27 opens, the pressure in chamber 26 is reduced, and the spill valve 24 opens fully to discharge fuel to the return line 25.

At relatively low levels of spill flow, fuel in the line 25 is returned to the inlet of the pump 12. As shown in FIG. 1 there is, however, provided a temperature responsive valve 80 which is operable, if the temperature of the returned fuel exceeds a predetermined level, to discharge at least a part of this fuel back to the tank 11. The effect of this arrangement is that overheating of the fuel due to continued recirculation is prevented.

Figure 4:
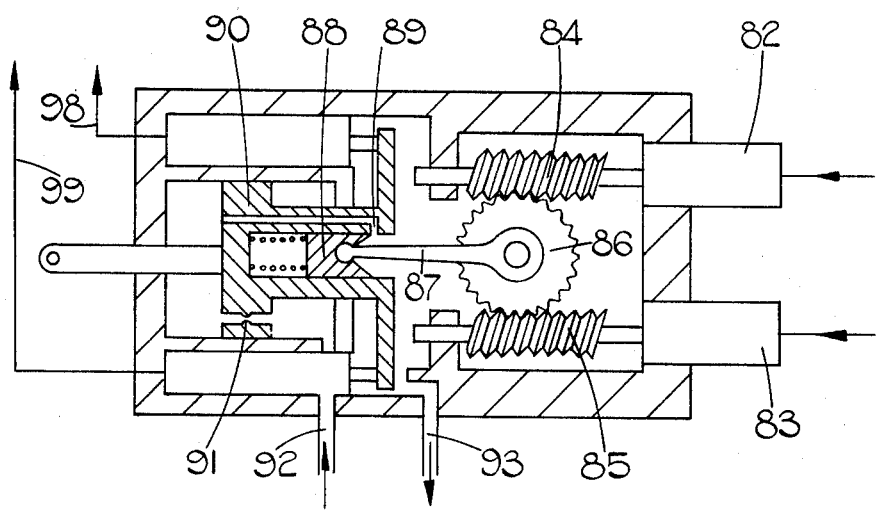
FIG. 4 shows, diagrammatically, an actuator for air control vanes on the gas turbine engine.

As shown in FIG. 1, the control system includes an actuator arrangement 81 for inlet guide vanes of the engine compressor. The actuator 81 is shown in more detail in FIG. 4, and includes two stepping motors 82, 83 drivingly connected to respective worms 84, 85. The worms 84, 85 both mesh with a wheel 86. An arm 87 is carried by the wheel 86, which can rotate relative to the arm 87. A valve control element 88 is located on the free end of the arm 87 and co-operates with a port 89 in a piston 90. Opposite sides of the piston 90 are interconnected through a restricted passage 91. One side of the piston is subjected to the pressure in a passage 92 which communicates with the passage 21, and the other side of the piston 90 is subjected to the pressure intermediate the restricted passage 91 and the port 89. The valve element 88 controls flow through the port 89 to a passage 93 which communicates with the passage 23.

In normal operation only the stepping motor 82 is operated, under control of the circuit 46, the worm 85 acting as a reaction member for the wheel 86. The combination of the control element 88 and the piston 90 provides a follow-up servo in which the piston 90 is moved so that its position corresponds to that of the control element 88. The piston 90 is connected by a suitable linkage to the engine inlet guide vanes.

Referring back to FIG. 3, a sleeve 95, surrounding the control member 52 of the valve 50, is responsive to the fuel pressure immediately downstream of the orifice controlled by the valve 50, and is biased by a spring 96 against this downstream pressure, to provide a pressurising valve when the valve 50 is open.

In addition to the values NL, NH, T and θ, the position feedback signals on lines 48, 49, and the signal from the sensing device 79, the control circuit 46 is also responsive to signals on a line 95 from a fuel density sensor 96 in the pump delivery passage 15. The circuit 46 is also responsive to feedback signals on lines 98, 99, these signals indicating the position of the piston 90 in the actuator arrangement 81.

I claim:

1. A shut-off valve arrangement for use in a fluid regulating system comprises a shut-off valve having a control member and biasing means urging said control member to a shut position, said control member being urged against said biasing means by a first servo pressure, a first pilot valve having a fluid pressure operable control element movable between a first position in which said first servo pressure is vented, and a second position, electrically energisable centre-stable valve means for applying operating pressures to said pilot valve control element so that movement of said valve means in a first sense from its stable central position causes said pilot valve control element to be urged to its first position, movement of said valve means in a second sense from its stable central position causes said pilot valve control element to be urged to its second position, and in the de-energised condition of said valve means said pilot valve control element is maintained in the position to which it was last urged.

2. An arrangement as claimed in claim 1 in which said centre-stable valve means comprises two control valves, a centre-stable electrical actuator, and means for connecting said control valves to said actuator so that when said actuator is in its stable central position, one of said control valves is open and the other of said control valves is shut, when said actuator is energised in said first sense both of said control valves are shut, and when said actuator is energised in said second sense both of said control valves are open.

3. An arrangement as claimed in claim 2 in which said first pilot valve includes biasing means urging said control element towards one of its positions and said operating pressures are operable to urge said control element against said biasing means, said control element including means for shutting off the operating pressure from one of said control valves when said control element is in said one position.

4. An arrangement as claimed in any preceding claim which includes a second pilot valve in parallel with said first pilot valve, for regulating said first servo pressure, and said shut-off valve control member includes means for regulating fluid flow in accordance with the magnitude of said first servo pressure.

5. A gas turbine engine fuel control system incorporating a variable metering device and a shut-off valve arrangement as claimed in any of claims 1, 2 or 3 in series with said metering device.

* * * * *